US005611551A

United States Patent [19]

Lin

[11] Patent Number: 5,611,551

[45] Date of Patent: Mar. 18, 1997

[54] COLLAPSIBLE WORKING CHAIR WITH A TOOL STORAGE CHAMBER

[76] Inventor: Jin-Chuang Lin, P. O. Box 82-144, Taipei, Taiwan

[21] Appl. No.: 529,858

[22] Filed: Sep. 18, 1995

[51] Int. Cl.[6] .................................................. B62B 11/00

[52] U.S. Cl. ......................... 280/32.5; 280/35; 297/338; 403/54; 403/84

[58] Field of Search ............................. 297/338, 344.15; 280/32.5, 32.6, 35, 639; 403/53, 54, 83, 84; 108/145

[56] References Cited

U.S. PATENT DOCUMENTS 3,179,072 4/1965 Coriell ................................ 297/338 X
3,223,055 12/1965 Braun ...................................... 108/145
4,832,355 5/1989 Hung ...................................... 280/32.5
4,895,380 1/1990 Brooks et al. ......................... 280/32.6
5,072,955 12/1991 Holland et al. ........................ 280/32.5
5,451,068 9/1995 Shockley ................................ 280/32.6
5,470,037 11/1995 Willis .................................... 403/84 X

*Primary Examiner*—Brian L. Johnson
*Assistant Examiner*—Michael Mar
*Attorney, Agent, or Firm*—Alfred Lei

[57] ABSTRACT

A collapsible working chair including a flat base equipped with swivel wheels for moving on the ground, the flat base having a recessed top side divided by a partition plate into a front open chamber for keeping tools and tool accessories, and a rear open chamber for receiving a seat, and two pairs of mounts symmetrically fixedly mounted in the rear open chamber; a seat supported on the flat base; and two pairs of folding collapsible supports connected between the mounts of the flat base and the seat, and set between the working position to support the seat above the flat base and the collapsed position to receive the seat within the rear open chamber of the flat base.

1 Claim, 6 Drawing Sheets

COLLAPSIBLE WORKING CHAIR WITH A TOOL STORAGE CHAMBER

BACKGROUND OF THE INVENTION

1. Field of the Invention

This invention relates to working chairs, and relates more particularly to a collapsible working chair which has a tool chamber for keeping hand tools and tool accessories and, which can be collapsed when not in use.

2. Description of the Prior Art

Regular tool cases are simply designed for carrying hand tools and tool accessories. If a tool case holds a variety of hand tools and tool accessories, it becomes heavy, and not easy to move in the working area by hand. Furthermore, regular working chairs are commonly made of fixed type, and the legs thereof cannot be moved on the ground.

SUMMARY OF THE INVENTION

This invention relates to working chairs, and relates more particularly to a collapsible working chair which has a tool chamber for keeping hand tools and tool accessories and, which can be collapsed when not in use.

According to one aspect of the present invention, the collapsible working chair comprises a flat base equipped with swivel wheels, and a seat supported on the flat base for sitting. By means of the swivel wheels, the collapsible working chair can be conveniently moved on the ground in the working area.

According to another aspect of the present invention, the flat base of the collapsible working chair has a recessed top side divided by a partition plate into a front open chamber for keeping tools and tool accessories, and a rear open chamber for receiving the seat.

According to still another aspect of the present invention, the collapsible working chair further comprises two pairs of folding collapsible supports connected between the seat and respective mounts in the rear open chamber of the flat base, wherein the folding collapsible supports can be set between the working position to support the seat above the flat base, and the collapsed position to receive the seat within the rear open chamber of the flat base.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
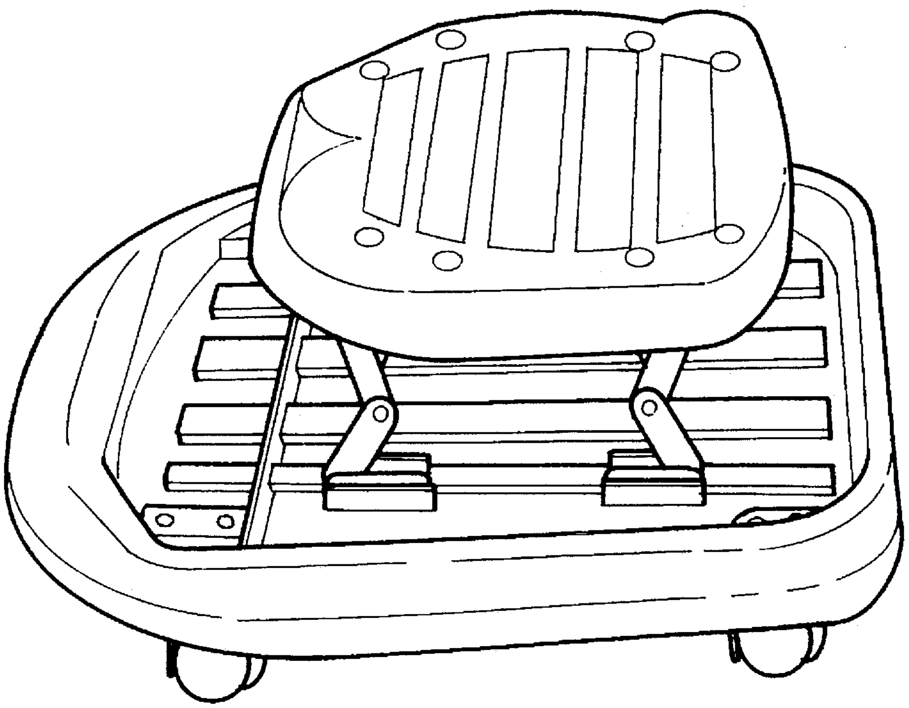
FIG. 1 is an elevational view of a collapsible working chair according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
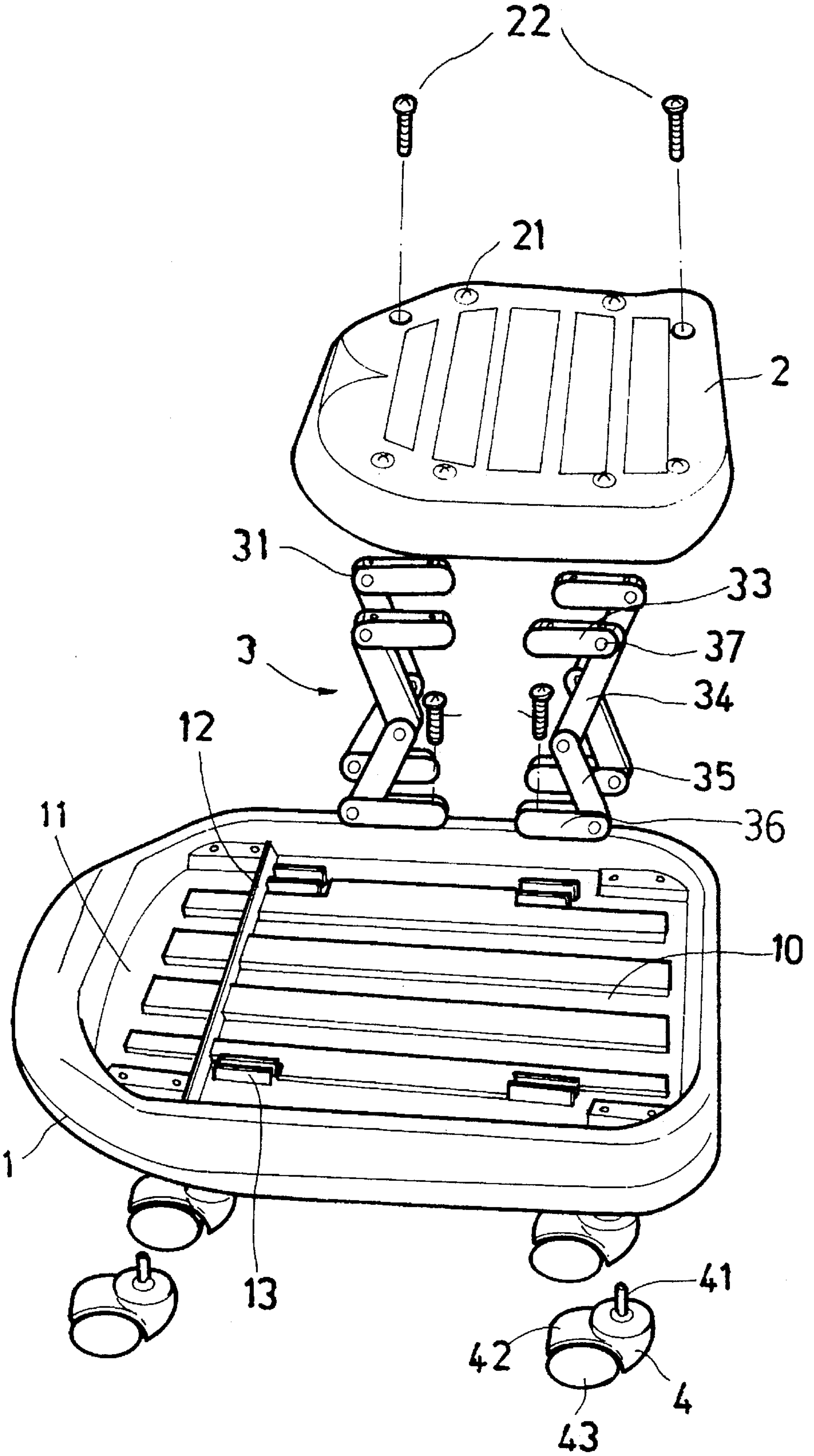
FIG. 2 is an exploded view of the collapsible working chair according to the present invention.

Referring to FIGS. 1 and 2, a collapsible working chair in accordance with the present invention is generally comprised of a base 1, two pairs of swivel wheels 4, a seat 2, and two pairs of folding collapsible supports 3. The base 1 is a flat, rectangular frame having a recessed top side divided by a partition plate into two open chambers, namely, the front open chamber 11 and the rear open chamber 10. The front open chamber 11 is designed for keeping hand tools and tool accessories. The rear open chamber 10 is designed for receiving the folding collapsible supports 3 and the seat 2. Two pairs of mounts 13 are fixedly fastened to the rear open chamber 10 for mounting the folding collapsible supports 3. The seat has a plurality of screw holes 21 respectively connected to the folding collapsible supports 3 by screws 22. The folding collapsible supports 3 are symmetrically connected between the base 1 and the seat 2, each comprising a channeled upper coupling block 33 fixedly secured to the seat 2, a channeled bottom coupling block 36 fixedly secured to one mount 13 of the base 1, two pivoted links 34 and 35 pivotably connected between the channeled upper coupling block 33 and the channeled bottom coupling block 36 by pivots 37. The swivel wheels 4 are symmetrically fastened to the bottom side of the base 1, each comprised of a wheel holder 42, a pair of rollers 43 coupled to the wheel holder 42 at the bottom, and a coupling shaft 41 raised from the wheel holder 42 at the top and revolvably mounted in a respective mounting hole (not shown) on the bottom side of the base 1.

Referring to FIGS. 3A and 2 again, the upper coupling block 33 has two through holes 38 fastened to the respective screw holes 21 of the seat 2 by the respective screws 22; the bottom coupling block 36 has two screw holes 39 fastened to respective screw holes (not shown) on one mount 13 by screws 22. Female coupling portions 31 and male coupling portions 32 are respectively made on the upper coupling block 33, the links 34 and 35, and the bottom coupling block 36. When the seat 2 is pulled upwards from the base 1, the folding collapsible supports 3 are respectively set in the working position as shown in FIG. 3A. When each folding collapsible support 3 is set in the working position, the female coupling portions 31 and the male coupling portions 32 are respectively engaged, the top end of the upper link 34 is stopped against the inside wall of the upper coupling block, the bottom end of the upper link 34 is firmly stopped at the top end of the lower link 35, and the bottom end of the lower link 35 is firmly stopped against the inside wall of the bottom coupling block 36.

Figure 3C:
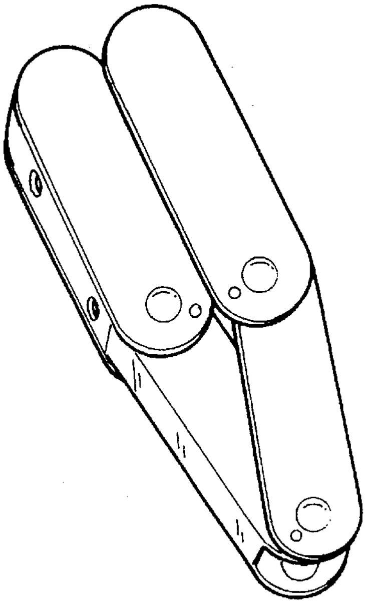
FIG. 3C shows the folding collapsible support of FIG. 3A collapsed.
Figure 3B:
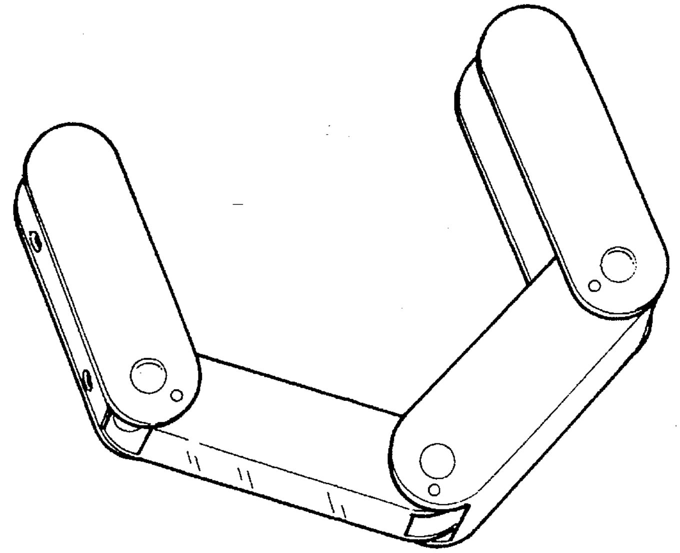
FIG. 3B shows the folding collapsible support of FIG. 3A turned from the working position to the collapsed position.
Figure 3A:
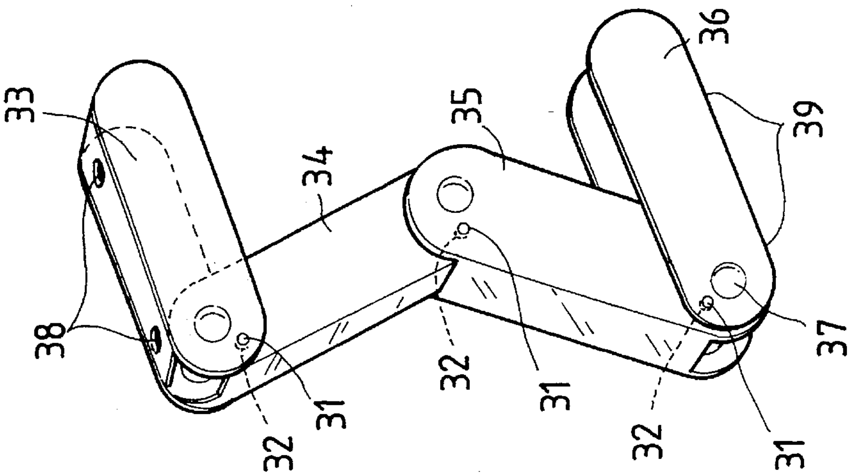
FIG. 3A is a perspective view of a folding collapsible support set in the working position according to the present invention.

Referring to FIGS. 3B and 3C, and FIG. 3A again, by pivoting the links 34 and 35 outwardly to release the respective female coupling portions 31 from the respective male coupling portions 32, the folding collapsible support is turned from the working position of FIG. 3A to the collapsed position as shown in FIG. 3C.

Figure 4:
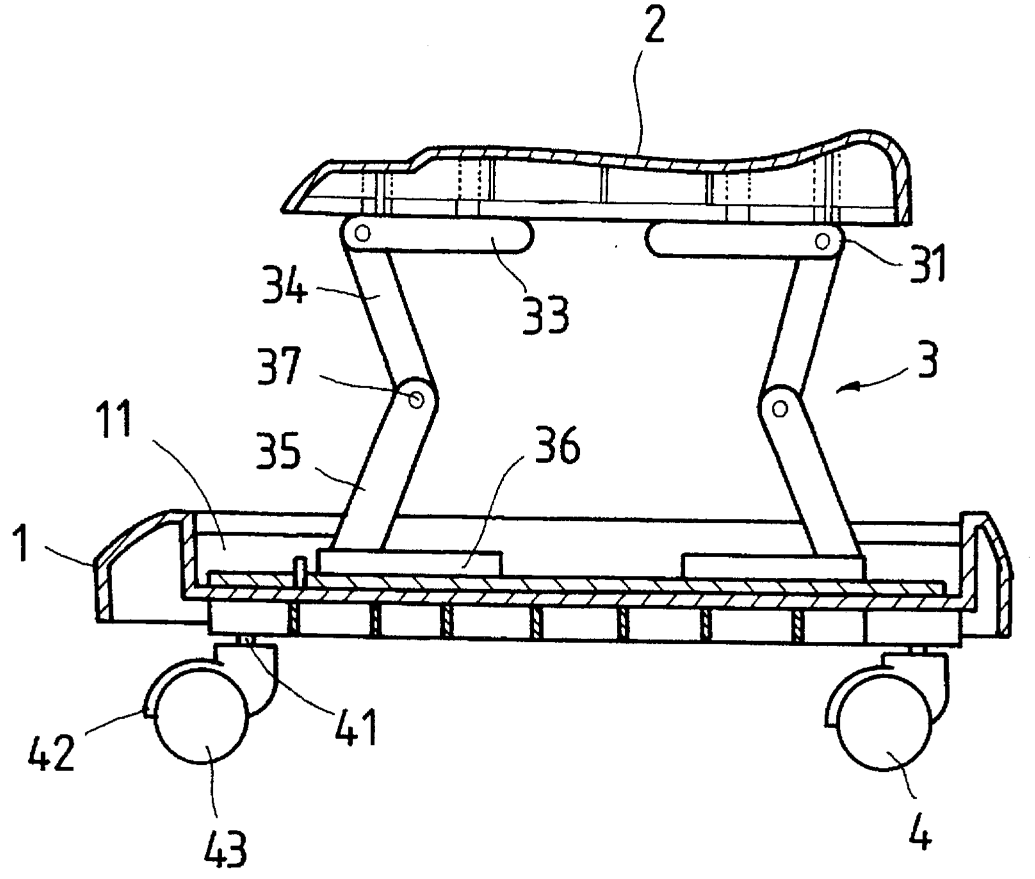
FIG. 4 is a side view in section showing the collapsible working chair set in the working position according to the present invention.
Figure 5A:
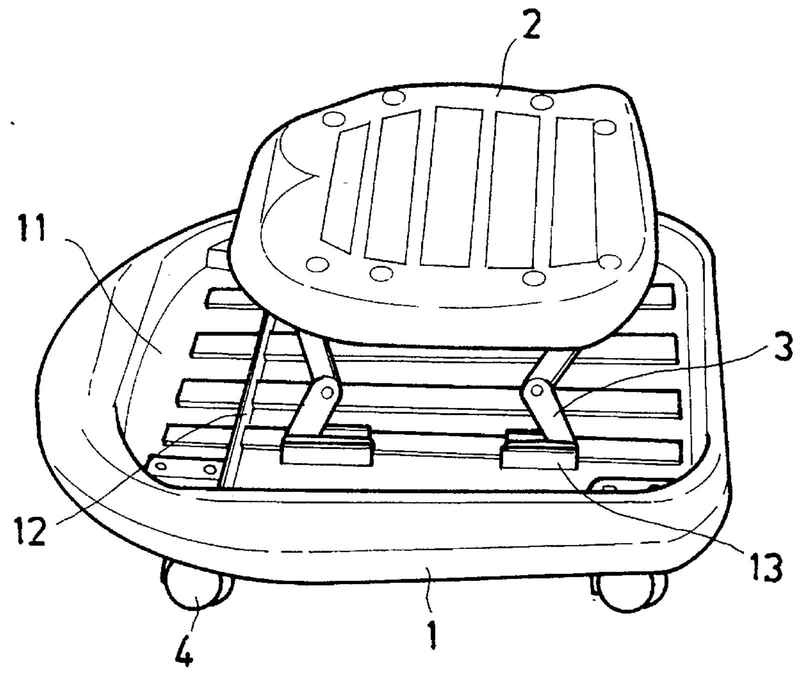
FIG. 5A is an elevational view showing the collapsible working chair set in the working position according to the present invention.

Referring to FIGS. 4 and 5A, when the folding collapsible supports 3 are set in the working position, the seat 2 is supported above the base 1 for sitting. Because the base 1 is supported on the swivel wheels 4, it can be conveniently moved on the floor.

Figure 5B:
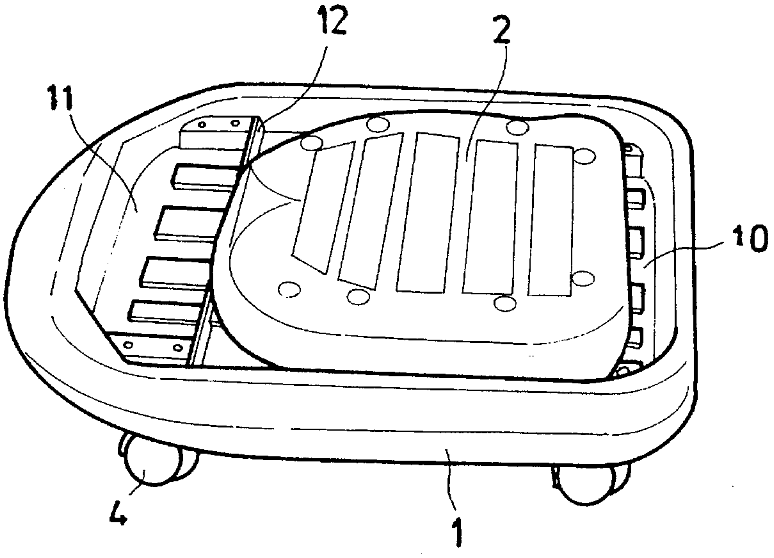
FIG. 5B is an elevational view showing the collapsible working chair collapsed according to the present invention.

Referring to FIG. 5B, when the collapsible working chair is not in use, the folding collapsible supports 3 are turned to the collapsed position, permitting the seat 2 to be received within the rear chamber 10 of the base 1.

Figure 6:
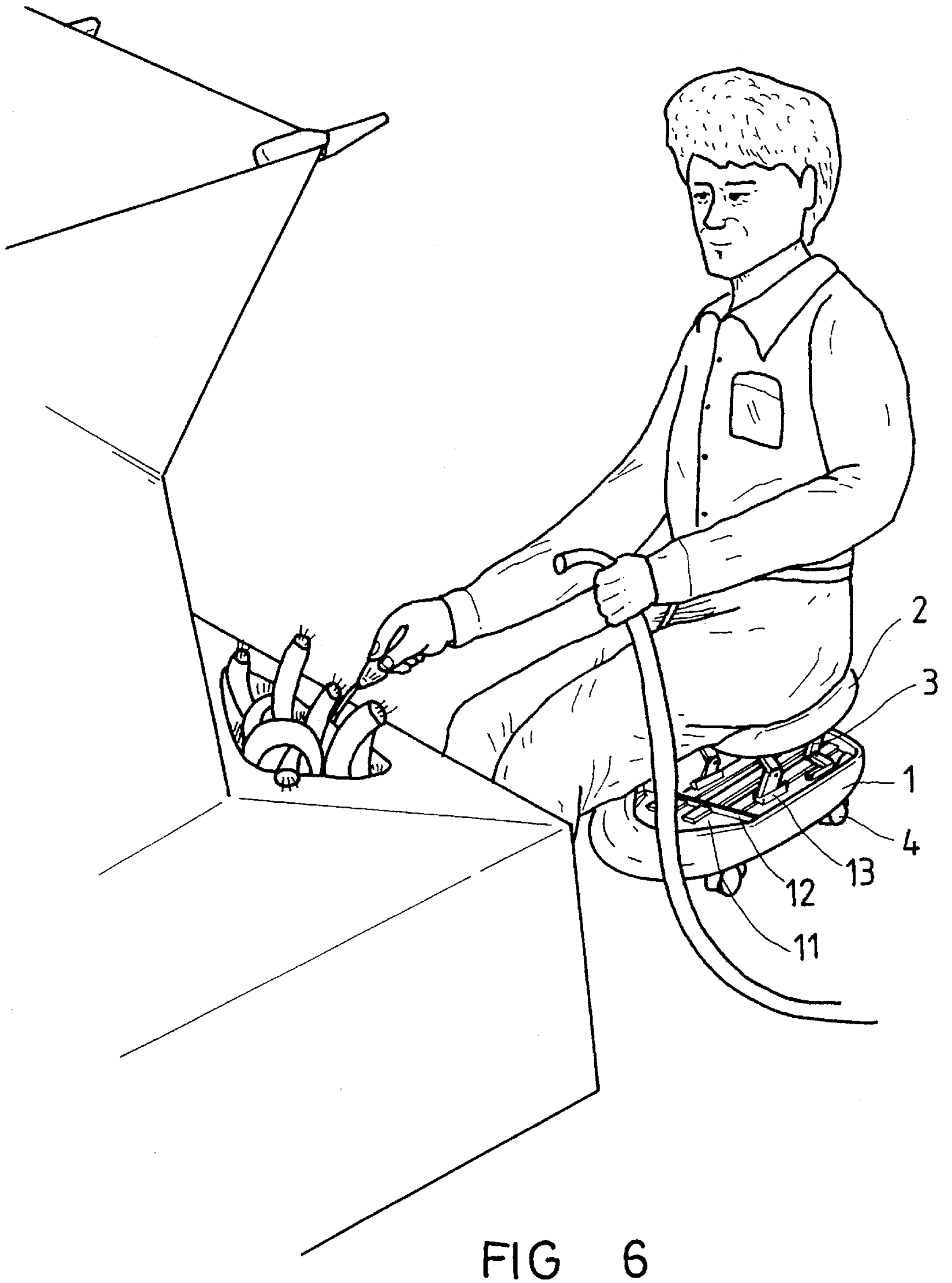
FIG. 6 is an applied view of the present invention, showing the collapsible working chair in use.

FIG. 6 shows the collapsible working chair in use. When the folding collapsible supports 3 are set in the working position, the seat 2 is supported above the base 1 for sitting. When the user sits on the seat 2, the user can conveniently move the working chair from place to place and turn the working chair to the desired direction by kicking the ground with the foot. During working, hand tools and tool accessories can be kept in the front open chamber 11 of the base 1.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A collapsible working chair comprising:

a flat base equipped with swivel wheels for moving on the ground, said flat base comprising a recessed top side divided by a partition plate into a front open chamber for keeping tools and tool accessories, and a rear open chamber for receiving a seat, two pairs of mounts symmetrically fixedly mounted in said rear open chamber;

a seat supported on said flat base; and two pairs of folding collapsible supports connected between said mounts of said flat base and said seat, and set between an extended working position to support said seat above said flat base and a collapsed position to receive said seat within said rear open chamber of said flat base;

wherein each folding collapsible support is comprised of a channeled upper coupling block fixedly secured to said seat by screws and having two female coupling portions bilaterally disposed at one end, a channeled bottom coupling block fixedly secured to one mount of said base by screws and having two female coupling portions bilaterally disposed at one end, an upper link having a top end pivoted to said channeled upper coupling block, and a bottom end, the top end and bottom end of said upper link each having two male coupling portions at two opposite sides, the male coupling portions of the top end of said upper link being for engagement with the female coupling portions of said channeled upper coupling block, and a lower link having a top end pivoted to the bottom end of said upper link and a bottom end pivoted to said channeled bottom coupling block, the top end of said lower link having two female coupling portions at two opposite sides for engagement with the male coupling portions of the bottom end of said upper link, the bottom end of said lower link having two male coupling portions at two opposite sides for engagement with the female coupling portions of said channeled bottom coupling block, the male coupling portions of said upper link being respectively engaged with the female coupling portions of said channeled upper coupling block and the female coupling portions of said lower link, and the male coupling portions of said lower link being engaged with the female coupling portions of said channeled lower coupling block when each folding collapsible support is set in the working position, each of said upper and lower links being channel shaped with opposed parallel wall portions interconnected by a transverse wall, said transverse wall of each lower link having an upper edge in abutting engagement with a lower portion of a respective upper link, for locking said upper and lower links in the extended position, when the collapsible supports are pivoted into their working position.

* * * * *